(12) United States Patent
Di Crescenzo

(10) Patent No.: US 8,990,566 B2
(45) Date of Patent: Mar. 24, 2015

(54) PRIVACY-PRESERVING PUBLISH-SUBSCRIBE PROTOCOL IN A CLOUD-ASSISTED BROADCAST MODEL

(71) Applicant: TT Government Solutions, Inc., Basking Ridge, NJ (US)

(72) Inventor: Giovanni Di Crescenzo, Madison, NJ (US)

(73) Assignee: TT Government Solutions, Inc., Basking Ridge, NJ (US)

( * ) Notice: Subject to any disclaimer, the term of this patent is extended or adjusted under 35 U.S.C. 154(b) by 80 days.

(21) Appl. No.: 13/775,926

(22) Filed: Feb. 25, 2013

(65) Prior Publication Data

US 2013/0246791 A1    Sep. 19, 2013

Related U.S. Application Data

(60) Provisional application No. 61/602,260, filed on Feb. 23, 2012.

(51) Int. Cl.
*H04L 29/06* (2006.01)
*G06F 21/60* (2013.01)

(52) U.S. Cl.
CPC ............ *H04L 63/045* (2013.01); *G06F 21/602* (2013.01); *H04L 63/062* (2013.01)
USPC ............................ 713/168; 713/185; 380/278

(58) Field of Classification Search
CPC .............................. H04L 63/062; H04L 63/045
USPC ............................................ 713/168; 380/278
See application file for complete search history.

(56) References Cited

U.S. PATENT DOCUMENTS

| | | | |
|---|---|---|---|
| 6,813,358 B1 * | 11/2004 | Di Crescenzo et al. | 380/280 |
| 7,844,496 B2 * | 11/2010 | Algesheimer et al. | 705/26.1 |
| 7,958,257 B2 * | 6/2011 | Gershinsky et al. | 709/238 |
| 8,027,923 B2 * | 9/2011 | Liu | 705/51 |
| 8,725,807 B2 * | 5/2014 | Luboshitz et al. | 709/204 |
| 2001/0055388 A1 * | 12/2001 | Kaliski, Jr. | 380/30 |
| 2002/0170053 A1 * | 11/2002 | Peterka et al. | 725/31 |
| 2003/0236993 A1 * | 12/2003 | McCreight et al. | 713/200 |

(Continued)

OTHER PUBLICATIONS

Lipmaa, "Verifiable Homomorphic Oblivious Transfer and Private Equality Test", Nov. 30, 2003, Helsinky Univ., p. 1-18.*

(Continued)

*Primary Examiner* — Mohammad L Rahman
*Assistant Examiner* — Gregory Lane
(74) *Attorney, Agent, or Firm* — Heslin Rothenberg Farley & Mesiti P.C.

(57) ABSTRACT

A method and system for providing privacy in a publish-subscribe protocol is provided. A server receives from a third party a topic-based key associated with a tree structure having a pseudonym of a topic as a root and at least one client as a leaf. The server encrypts a key associated with a conditional oblivious transfer protocol using the topic-based key. The server encrypts an item with the key associated with the conditional oblivious transfer protocol. The server transmits the encrypted key and the encrypted item to a plurality of clients. The encrypted item is decryptable by the at least one client with the key associated with the conditional oblivious transfer protocol when the key associated with the conditional oblivious transfer protocol is decryptable with an interest-based key associated with a tree structure having a pseudonym of an interest as a root and the at least one client as a leaf.

22 Claims, 6 Drawing Sheets

(56) References Cited

U.S. PATENT DOCUMENTS

| | | | |
|---|---|---|---|
| 2004/0054722 A1* | 3/2004 | DeFloor et al. | 709/203 |
| 2007/0101416 A1* | 5/2007 | Kim | 726/5 |
| 2007/0106754 A1* | 5/2007 | Moore | 709/217 |
| 2008/0107272 A1* | 5/2008 | Carmeli et al. | 380/278 |
| 2008/0248819 A1* | 10/2008 | Smith et al. | 455/466 |
| 2010/0094937 A1* | 4/2010 | Chalouhi et al. | 709/204 |

OTHER PUBLICATIONS

Nascimento, "On the Oblivious-Transfer Capacity of Noisy Resources", Jun. 2008, IEEE, p. 2572-2581.*

* cited by examiner

PRIVACY-PRESERVING PUBLISH-SUBSCRIBE PROTOCOL IN A CLOUD-ASSISTED BROADCAST MODEL

CROSS-REFERENCE TO RELATED APPLICATIONS

This application claims the benefit of U.S. provisional patent application No. 61/602,260 filed Feb. 23, 2012, the disclosure of which is incorporated herein by reference in its entirety.

FIELD OF THE INVENTION

The present invention relates to publish-subscribe protocols. More particularly, the present invention relates to a method and system for providing privacy in a publish-subscribe protocol.

BACKGROUND OF THE INVENTION

Publish-subscribe protocols have been employed for the distribution of streaming data. A common publish-subscribe protocol is an RSS (Rich Site Summary) feed. An RSS feed is a family of web feed formats used to publish frequently updated works in a standardized format. The data transmitted in an RSS feed may include blog entries, news headlines, audio, and video. RSS feeds or documents include full or summarized text, plus metadata such as publishing dates and authorship. RSS feeds can be read using software called an "RSS reader", "feed reader", or "aggregator", which can be web-based, desktop-based, or mobile-device-based. The user subscribes to a feed by entering into the reader a URI of the feed or by clicking a feed icon in a web browser that initiates the subscription process. The RSS reader checks the user's subscribed feeds regularly for new work, downloads any updates that it finds, and provides a user interface to monitor and read the feeds.

A user can subscribe to a topic, such as finance, and receive in an email daily or monthly or weekly messages only in finance. The user receives RSS feeds only in areas (associated with the topic) to which they subscribe. The user does not receive of all documents that are published by one particular publisher.

An RSS feed is a specific instance of the more general class of publish-subscribe protocols which employ the publish-subscribe architectural pattern. Publish-subscribe is a messaging pattern where senders of messages, called publishers, do not program the messages to be sent directly to specific receivers, called subscribers. Instead, published messages are characterized into classes, without knowledge of what, if any, subscribers there may be. Similarly, subscribers express interest in one or more classes, and only receive messages that are of interest, without knowledge of what, if any, publishers there are.

More particularly, in a publish-subscribe architecture, a subscriber can specify interests—cats, dogs, the stock market, finance, education, etc. A publisher may periodically publish items (e.g. documents) that may include attached tags, known as topics. These topics are included in a dictionary of topics. The dictionary is shared with subscribers. The subscribers may find their interests in the dictionary. A dictionary is a collection of all topics that each item may or may not relate to, and is known to all participants (e.g., subscribers and publishers). Interests are elements from the dictionary associated with a subscriber. Topics are elements from the dictionary associated with an item. Items may be digital documents in any format. If one of the interests of the subscriber is determined by the publisher to be equal to one of the topics of the next item to be published by the server, then the subscriber receives the item once it is published by the publisher. If no interests match any topics in the dictionary of the publisher, then the subscriber does not receive the item to be published.

A problem often encountered in circumstance where publish-subscribe protocols are employed is privacy violations— e.g., privacy with respect to transmitted data and/or the interests and/or identity of the subscribers. In the examples below, the clients are not malicious and clouding but are considered honest but curious.

For example, in a typical RSS feed, a subscriber reveals their interests, e.g., finance, and the publisher may view the interests; thus, the publisher may obtain some information about the personal choices of the subscriber. As a result, the privacy of the subscriber may be violated. Other instances of violations of privacy are more sensitive. For example, from the government's perspective, there may be sensitive databases that reveal sensitive material and topics, e.g., an agency may publish documents. One agency is interested in a certain document; another agency may be interested in another document. In certain circumstances, without privacy protections in place, an intruder in one agency may determine the interests of another agency. In another example, one or more subscribers are interested in the Facebook stock. As a result, a publisher or an external intruder may learn that a number of subscribers are suddenly interested in Facebook stock. Thus, privacy is an important issue with respect to transmission of documents employing publish-subscribe protocols.

While the types of clients described above may be honest but curious, there are circumstances in which clients may be malicious and colluding. For example, a malicious client may receive a document and perform traffic analysis on another client's communication with, for example, a third party to derive information on whether the two share an interest. The malicious client can build statistics on topics that other clients are interested in and how many topics are being sent to a particular client.

Currently deployed publish-subscribe methods and systems target a very limited set of security or privacy requirements (if at all). For example, centralized architectures generally employ a server that is trusted and that further protects against outsiders and client misbehavior through authentication and transport layer security (e.g., SSL/TLS. See Tim Dierks, Eric Rescorla, "The Transport Layer Security (TLS) Protocol Version 1.2.," Internet Engineering Task Force, Request for Comments 5246, August 2008). Similarly, distributed implementations commonly operate in the "fortress model" in which participants are trusted and outsiders are not trusted (See Yair Amir, Cristina Nita-Rotaru, Jonathan Stanton, Gene Tsudik, "Secure Spread: An Integrated Architecture for Secure Group Communication," IEEE Transactions on Dependable and Secure Computing (TDSC), 2(3): 248-261, (2005)).

The work of Castro and Liskov (See Miguel Castro and Barbara Liskov, "Practical Byzantine Fault Tolerance and Proactive Recovery," ACM Trans, Comput. Syst., 20(4): 398-461 (2002)) even as extended to achieve perform well when under attack as described in Yair Amir, Brian Coan, Jonathan Kirsch, John Lane, "Byzantine Replication Under Attack," In Proc. of the 38th IEEE International Conference on Dependable Systems and Networks (DSN08), 2008: 197-206 and in Allen Clement, Edmund Wong, Lorenzo Alvisi, Mike Dahlin, Mirco Marchetti, "Making Byzantine Fault Tolerant Systems Tolerate Byzantine Faults," In Proc. of the 6th USENIX Symposium on Networked Systems Design and Implementation, 2009: 153-168, provide functionality in the presence of compromised components, but do not attempt to provide client privacy. A well-studied area in cryptography research, known as Secure Multi-Party Computation (or Secure Function Evaluation (see Andrew Chi-Chih Yao, "Theory and Applications of Trapdoor Functions (Extended Abstract)," In Proc. of IEEE FOCS 1982: 80-91 and Oded Goldreich, Silvio Micali, Avi Wigderson, "How to Play any Mental Game or A Completeness Theorem for Protocols with Honest Majority," In Proc. of ACM STOC 1987: 218-229) address the general problem of two or more parties, each with its own input, jointly and privately computing a function over the inputs. This general approach provides more capability than is needed to implement private publish-subscribe, and is thus too expensive. Basic and well-studied problems in cryptography research, addressing secure computation of specific functions, include Private Information Retrieval (where a client is interested in obtaining one out of a server's many strings without revealing which one) (see Benny Chor, Eyal Kushilevitz, Oded Goldreich, Madhu Sudan, "Private Information Retrieval," In J. ACM 45(6): 965-981 (1998) and Eyal Kushilevitz, Rafail Ostrovsky, "Replication is NOT Needed: SINGLE Database, Computationally-Private Information Retrieval," In Proc. of IEEE FOCS 1997: 364-373), Oblivious Transfer (here, the server transfers the client's desired string without knowing which one or revealing all other ones (see Michael 0. Rabin, "How to Exchange Secrets with Oblivious Transfer," Technical Report TR-81, Aiken Computation Lab, Harvard University, 1981), Private Set Intersection (see, e.g., Michael J. Freedman, Kobbi Nissim, Benny Pinkas, "Efficient Private Matching and Set Intersection," In Proc. of EUROCRYPT 2004: 1-19 (in this method, two parties hold a set of values and at the end of the protocol one of them can compute the intersection of the two sets), and Conditional Oblivious Transfer in Giovanni Di Crescenzo, Rafail Ostrovsky, Sivaramakrishnan Rajagopalan, "Conditional Oblivious Transfer and Timed-Release Encryption," In Proc. of EUROCRYPT 1999: 74-89 (a variant of oblivious transfer such that a message is sent from a sender to a receiver if and only if a predicate over the two parties' inputs is true, and the sender does not know the predicate value).

Other security and cryptography research has directly considered the problem of designing secure and/or private publish-subscribe protocols. This research has fallen short as having either a different participant model (i.e., which typically considers publishers as active participants or entirely distributed models with no servers or third parties), having a different set of capabilities and functionalities (i.e., which typically ignores protocol dynamics such as subscription updates or only target sophisticated filtering rules for content publication), or having a different set of security and/or privacy requirements (i.e., which often requires privacy against intermediate routing nodes or privacy only against the server, or which targets more demanding requirements which ultimately result in non-efficient protocols).

The work described in Costin Raiciu, David S. Rosenblum, "Enabling Confidentiality in Content-Based Publish/Subscribe Infrastructures," In Proc. of SecureComm 2006: 1-11 (based on ideas on searchable encryption from Dawn Song, David Wagner, and Adrian Perrig, "Practical Techniques for Searches on Encrypted Data," In Proc. of the IEEE Symposium on Security and Privacy, 2000), provides a very efficient publish-subscribe protocol in a restricted participant model (a 1-server, 1-client model), but which only supports privacy against a server and not against clients and does not support subscription updates by clients and related privacy requirements.

Accordingly, what would be desirable, but has not yet been provided, is a method and system for providing security and privacy guarantees in a publish-subscribe protocol in the presence of malicious and colluding clients.

SUMMARY OF THE INVENTION

The above-described problems are addressed and a technical solution is achieved in the art by providing a method for providing security and privacy guarantees in a publish-subscribe protocol in the presence of malicious and colluding participants. In an embodiment, the server key is shared by the server and the third party, but not by a client. The server key and a third party key may be symmetric keys and may differ from each other. The server receives from at least one client a masked version of a pseudonym of an interest. The masked version of the pseudonym of the interest is produced by the application of a function using the server key to an interest of the at least one client to produce an interest pseudonym and the application of the function using a third party key to the interest pseudonym. The function may be a pseudo-random function. The pseudo-random function may be implemented using a block cipher or a keyed cryptographic hash function.

The server transmits a digital signature derived from the masked version of the pseudonym of the interest to a plurality of clients. In response, the at least one is configured to forward an "add" or "delete" indication of the interest and to forward the digital signature of the masked interest pseudonym to the third party. The at least one client is further configured to calculate and forward the interest pseudonym based on the digital signature of the masked interest to the third party. The at least one client is further configured to receive from the third party an interest-based key associated with a tree structure having the pseudonym of the interest as a root and the at least one client as a leaf. This occurs when the third party verifies the signature using the public verification key and inserts the interest pseudonym into the tree structure. The tree structure may be a broadcast encryption tree structure.

In an embodiment, the server receives an item with associated topics. The server computes a topic pseudonym of a topic associated with an item by applying the function using the server key to the topic. The server transmits the topic pseudonym to the third party. The server receives from the third party a topic-based key associated with a tree structure having the pseudonym of a topic as a root and the at least one client as a leaf. This occurs after the third party inserts the interest pseudonym into the tree structure. The tree structure may be a broadcast encryption tree structure. The server encrypts a key associated with a conditional oblivious transfer protocol using the topic-based broadcast encryption key. The server encrypts an item with the key associated with the conditional oblivious transfer protocol. The server transmits the encrypted key and the encrypted item to the plurality of clients.

To prevent traffic analysis, the server may broadcast these keys to all clients even though only clients in the same tree will be able to decrypt the item. The encrypted item may be decryptable by the at least one client with the key associated with the conditional oblivious transfer protocol when the key associated with the conditional oblivious transfer protocol is decryptable with the interest-based broadcast encryption key.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which.

It is to be understood that the attached drawings are for purposes of illustrating the concepts of the invention and may not be to scale.

DETAILED DESCRIPTION OF THE INVENTION

The present invention relates to a method and system for providing security and privacy guarantees in a publish-subscribe protocol in the presence malicious and colluding clients.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
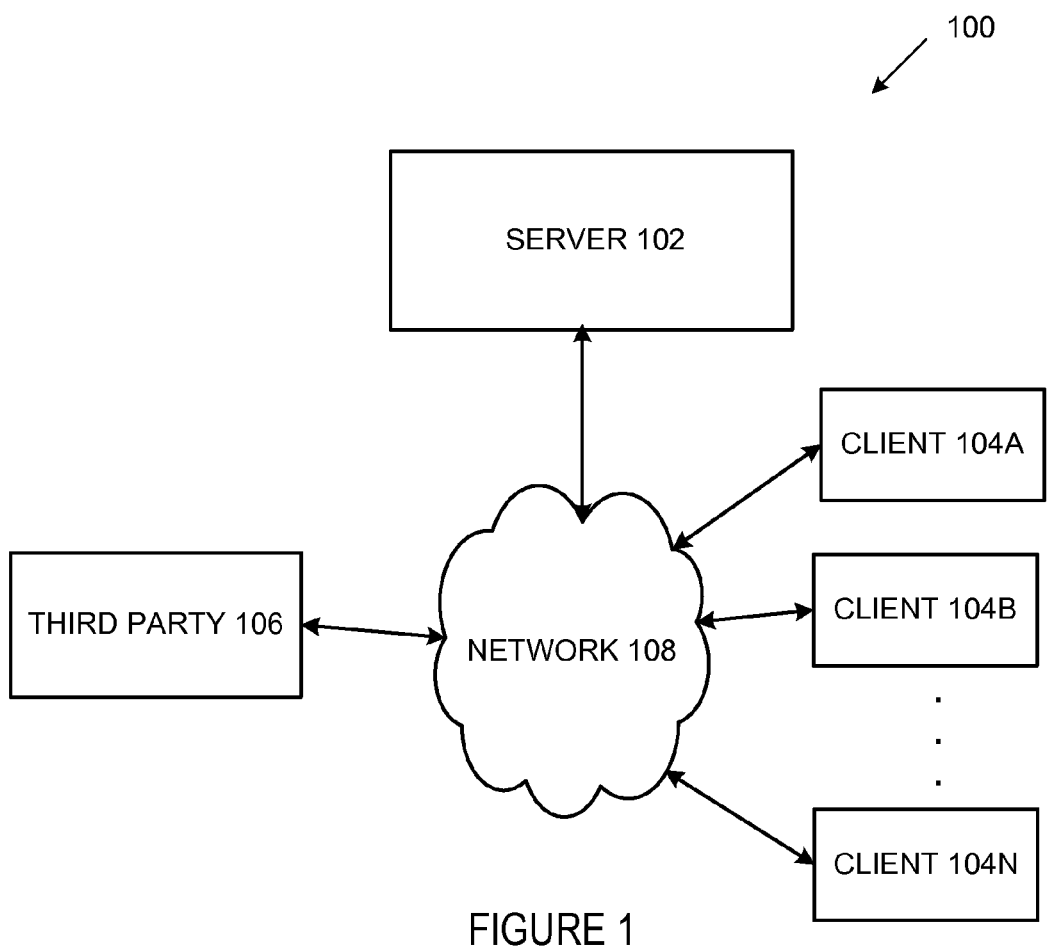
FIG. 1 is a block diagram of a system in which embodiments of the present disclosure may operate.

FIG. 1 is a block diagram of a system 100 in which embodiments of the present disclosure may operate. The system 100 realizes a publish-subscribe protocol with privacy based on the following basic definitions about data, participants, and communication capabilities between the participants. As used herein, items are digital documents in any format to be published. A dictionary is a collection of all topics that each item may or may not relate to, and is known to all participants (e.g., all 128-character strings). Interests are elements from the dictionary associated with a client. Topics are elements from the dictionary associated with an item to be published.

Returning to FIG. 1, the system 100 includes a server 102 configured to process submitted items (and associated topics) and interests of one or more clients 104a-104n to realize the publish-subscribe functionality. In an embodiment, the server 102 functions as a publisher. The one or more clients 104a-104n are configured to submit and update subscriptions based on their interests and configured to receive items that match their current interests. In an embodiment, the clients 104a-104n function as subscribers. A third party 106 is configured to aid the server 102 and the clients 104a-104n in carrying out their functionality. In on embodiment, the third party may be a computing system comprising one or more servers. In one example, the third party 106 may be a cloud server in a cloud computing environment. The server 102, the clients 104a-104n, and the third party 106 may be interconnected by a network 108 (e.g., the Internet). In one example, the network 108 may be assumed to encounter no packet loss or temporarily disconnected participants 102, 104a-104n, 106.

In one embodiment, the system 100 is configured to implement a publish-subscribe protocol by employing phases of operation comprising setup, subscription, publication, and optionally, item deletion. During the setup phase, the server 102, the clients 104a-104n, and the third party 106 may exchange messages to initialize their data structures and/or cryptographic keys. During the subscription phase, the clients 104a-104n may update (add/delete) their interests with the server 102 or the third party 106. During the publication phase, after receiving a new item (e.g., a data item) and associated topics from the clients 104a-104n, the server 102 may distribute the item to the clients 104a-104n based on the topics of the item and the interests of the clients 104a-104n, possibly in collaboration with the third party 106. Publication protocols may follow at least one of two modes: push mode and/or pull mode. In push mode, after an item is submitted, the item is processed by the server 102 and the third party 106 and transmitted one or more of the clients 104a-104n. In pull mode, at any given time, a client (e.g., 104a) may query the server 102 or the third party 106 for any (not previously retrieved) item whose topics match the interests of the client (e.g., 104a). In the item delete phase, the server 102 (and possibly the third party 106) may delete items (e.g., for storage efficiency purposes).

A person skilled in the art would appreciate that the (data) item input to the server 102 may originate from any number and types of sources. For example, the (data) item may originate from the publisher/server 102. In another example, the publisher may receive the next data item from any other party that asks the publisher to publish a data item. In another example, the publisher may receive the next (data) item from an independent information source.

Figure 2:
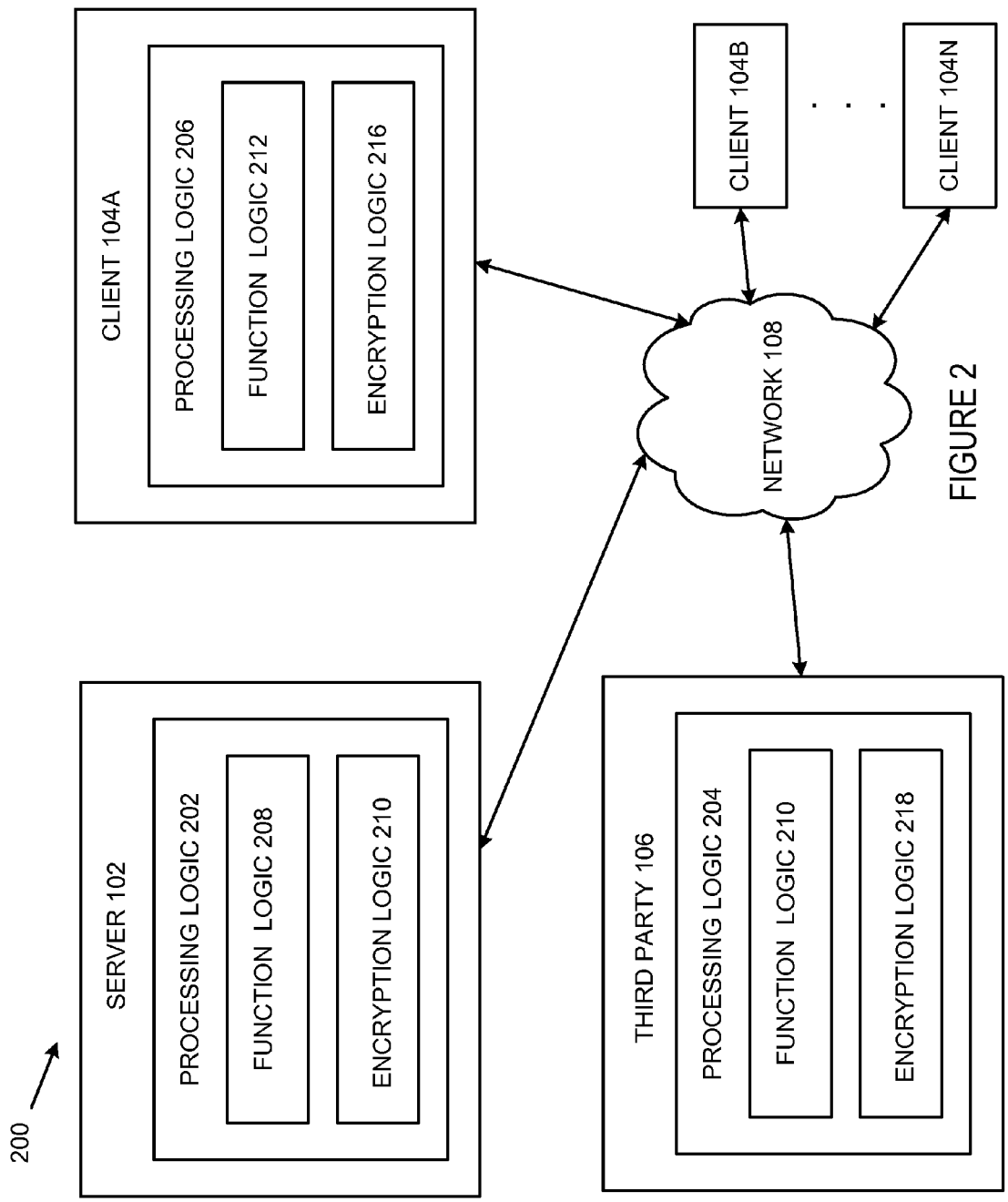
FIG. 2 is a block diagram of a software architecture in which embodiments of the present disclosure may operate.

FIG. 2 is a block diagram of a software architecture 200 in which embodiments of the present disclosure may operate. Referring now to FIGS. 1 and 2, each of the server 102, the clients 104a-104n, and the third party 106 are configured to implement corresponding processing logic 202, 204, 206, each of which implements corresponding function logic 208, 210, 212, respectively. The function logic 208, 210, 212 are configured to implement an arbitrary pseudo-random function F. In one example, the pseudo-random function may be implemented using a block cipher such as AES (Advanced Encryption Standard) or a keyed cryptographic hash function such as HMAC (hash-based message authentication code). Processing logic 202, 204, 206 are further configured to implement encryption logic 214, 216, 218 for implementing an arbitrary symmetric encryption scheme (E, D), where E is an encryption algorithm and D is a decryption algorithm. In one example, the symmetric encryption scheme (E, D) may be implemented using a block cipher such as AES (Advanced Encryption Standard) in a mode of operation such as CBC (cipher-block chaining).

To avoid malicious and colluding behavior on the part of the clients 104a-104n, all of the clients 104a-104n are configured to receive an encrypted item but only interested clients (e.g., 104a, 104b) can decrypt it. Interest pseudonyms are as shared keys among all of the clients (e.g., 104a, 104b) that share the same interest, and the server 102 and the clients 104a-104n are configured to run a conditional oblivious protocol with equality predicate for each one of the shared keys. To deal with dynamic client subscriptions, these shared keys are updated using re-keying protocols proposed in the area of broadcast encryption as described, for example, in Amos Fiat, Moni Naor "Broadcast Encryption," In Proc. of Crypto, 1993: 480-491 (This paper studies protocols to permit a dynamic group of clients (e.g., 104a-104n) to share a key for secure broadcast transmission, typically using a tree-based structure, and allows for efficient re-keying protocols when clients 104a-104n join or leave the group.) In an embodiment, broadcast encryption may be applied to the publish-subscribe system 100 to create, manage and update a broadcast encryption tree with one interest pseudonym as its root key, and to add/delete an interest of a client (e.g., 104a) by adding/deleting a participant to that interest's broadcast encryption tree.

To deal with malicious clients both the server 102 and the clients 104a-104n are configured to contact the third party 106 storing the broadcast encryption key to acquire the appropriate cryptographic key that will make the conditional oblivious transfer protocol succeed. For each broadcast encryption tree associated with an interest pseudonym, the root key is provided to a client (e.g., 104a) (during the subscription protocol) if the client (e.g., 104a) provides the third party 106 an authorizing signature from the server 102, and to the server 102 (during the publish operation) if the server 102 provides the third party 106 with an item topic that maps to the same pseudonym. Thus, in the case of an item topic equal to a client's interest (and only in that case), both the server 102 and the client (e.g., 104a) will obtain the same root key and they can use it as input to a conditional oblivious transfer protocol with equality predicate, so that the item decrypting key k can be transferred to the client (e.g., 104a).

As preliminaries to the execution of the embodiments described, in order to provide privacy against malicious clients, the communication between all participants is secured using either a point-to-point secure communication such as SSL/TLS (transport layer security) or using other methods for encryption, authentication and time-stamping that achieve the needed security properties without incurring the full cost of SSL/TLS. Moreover, the third party 106 is configured to maintain a broadcast encryption tree for each interest pseudonym for which there currently is at least one subscription, where the tree leaves are associated with the subscribers that are currently subscribed to the interest associated with this tree. The internal nodes and leaves of the tree contain cryptographic keys that may vary depending on which tree-based, broadcast encryption schemes may be (e.g., as described in any one of Dalit Naor, Moni Naor, Jeff Lotspiech, "Revocation and Tracing Schemes for Stateless Receivers," In Proc. of Crypto 01, 2001:41-62, Yong Ho Hwang, Pil Joong Lee, "Efficient Broadcast Encryption Scheme with Log-Key Storage," In Proc. of Financial Cryptography 2006: 281-295, or Giovanni Di Crescenzo, Olga Kornievskaia, "Efficient Re-Keying Protocols for Multicast Encryption," In Proc. of the Third International Conference on Security in Communication Networks, 2002: 119-132. Broadcast encryption trees permit efficient addition and deletion of interests by subscribers, handling the subscribers as additions or deletions of subscribers to a specific broadcast encryption tree associated with the added or deleted interest. Efficiency is logarithmic or polylogarithmic in the number of tree leaves (depending on which scheme is selected).

Further, an interest pseudonym may be represented as ip=F (skey, "interest name from dictionary") and its computation is performed by the client (e.g., 104a) in the subscription protocol, where it is provided to the server 102 in masked form, using a key tpkey shared by the client (e.g., 104a) and the third party 106. A topic pseudonym tp is similarly represented and its computation is performed by the server 102 in the publishing protocol. The client (e.g., 104a) and server 106 use ip and tp, respectively, to obtain from the third party 106 the keys at the root of the broadcast encryption trees associated with these two strings. When there is a match between an item's topic and a client subscription, it holds that ip=tp, wherein the two root keys are the same. As a result, an equality-based conditional oblivious transfer protocol suffices to perform a matching-based oblivious transfer protocol.

Figure 3:
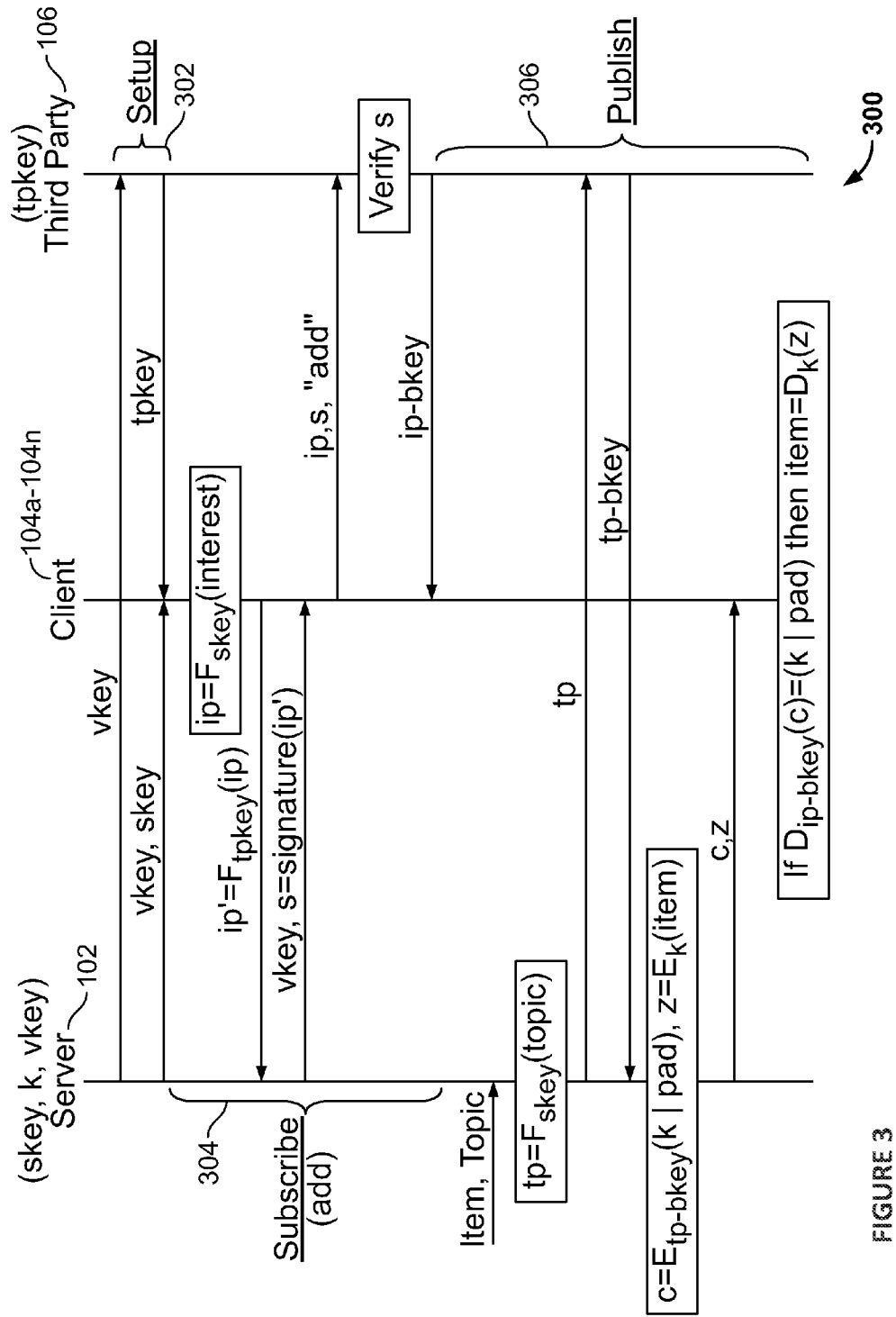
FIG. 3 is a message sequence diagram illustrating messages exchanged between a client, the server, and the third party for implementing one embodiment of a publish-subscribe protocol with privacy.

FIG. 3 is a message sequence diagram 300 illustrating messages exchanged between a client (e.g., 104a), the server 102, and the third party 106 for implementing one embodiment of a publish-subscribe protocol with privacy. For simplicity, one interest and one topic are assumed.

During a setup phase 302, in one embodiment, the clients 104a-104n are configured to share a symmetric key, skey, with the server 102 and a different symmetric key, tpkey, with the third party 106. These keys are used as input to a pseudo-random function F to compute a cryptographic pseudonym for interests of a client (e.g., 104a) in a way that neither the server 102 nor the third party 106 can learn any information about an interest from its pseudonym. In the subscription phase, a masked pseudonym is computed by two sequential applications of F. These keys may be shared by all clients 104a-104n. The server 102 also has a public verification key vkey for digital signatures and distributes vkey to all participants, 104a-104n, 106.

During a subscription phase 304, a client (e.g., 104a) may be configured to add interests and delete other interests. The client (e.g., 104a) may be configured to compute pseudonyms for the interests to be added as ip=F(skey, "interest name from dictionary"), and transmits to the server 102 a masked version of ip, ip'=Ftpkey(ip), where tpkey is the key shared by clients 104a-104n and the third party 106. In response, the server 102 is configured to produce a digital signature s for ip' and transmit the digital signature s to the client (e.g., 104a). The client (e.g., 104a) is configured to forwards s and ip to the third party 106 with an "add" label (note that the client 104a transmits ip rather than ip' since ip may serve as the broadcast encryption tree identifier; furthermore, the third party 106 may compute ip' from ip using tpkey). The third party 106 is configured to compute ip' from ip using tpkey and verifies that s is a valid digital signature for ip'. If the verification was successful, the third party 106 is configured to perform a node addition to a broadcast encryption tree associated with ip by updating a small number of keys at the tree nodes, including the root key ip-bkey. The third party is further configured to transmit the updated keys, including the new root key, to the client (e.g., 104a), and to all other clients (104b-104n) in the same tree. To prevent traffic analysis, the server 102 may broadcast these keys to all clients (104a-104n) even though only clients in the same tree will be able to meaningfully use this message (i.e., be able to decrypt a data item). This root key may be employed by the client in an equality-based conditional oblivious transfer during the publication phase.

To delete an interest from a subscription of a client (e.g., 104a), the client 104a is configured to inform the server 102 by transmitting s and ip to the third party 106 with a "delete" label. In response, the third party 106 computes ip' from ip using tpkey and verifies that s is a valid digital signature for ip'. If the verification was successful, the third party 106 is configured to perform a node deletion in the broadcast encryption tree associated with ip by updating a small number of keys at the tree nodes, including the root key ip-bkey, and is configured to transmit the updated keys, including the new root key, to all clients 104a-104n as in the interest addition case.

During a publish phase 306, in an embodiment, after receiving an item with its topics, the server 102 is configured to compute the topic pseudonym value tp (as mentioned above) for each of the item topics. Then the server 102 is configured to transmit the resulting topic pseudonyms to the third party 106. In response, the third party 106 is configured to transmit a root key tp-bkey to the server 102. This root key is employed by the server 102 in an equality-based conditional oblivious transfer protocol (similar to what is described in Costin Raiciu, David S. Rosenblum, "Enabling Confidentiality in Content-Based Publish/Subscribe Infrastructures," In Proc. of SecureComm 2006: 1-11, based on the searchable encryption mechanism from Dawn Song, David Wagner, and Adrian Perrig "Practical Techniques for Searches on Encrypted Data," In Proc. of the IEEE Symposium on Security and Privacy, 2000) to transmit the key k encrypting the item, together with the item encryption itself to all of the clients (104a-104n). Note that the message transmitted by the server 102 is the same for all clients 104a-104n, and thus malicious and colluding clients will not obtain any new information by eavesdropping and performing traffic analysis on other clients' communication. In the pull mode, the message returned by the conditional oblivious transfer is transmitted to a client (e.g., 104a) requesting a pull; in the push mode, it is transmitted to each client 104a-104n. More particularly, to prevent traffic analysis, the server 102 may broadcast these keys to all clients (104a-104n) even though only clients in the same tree will be able to meaningfully use this message (i.e., be able to decrypt a data item).

Figure 4:
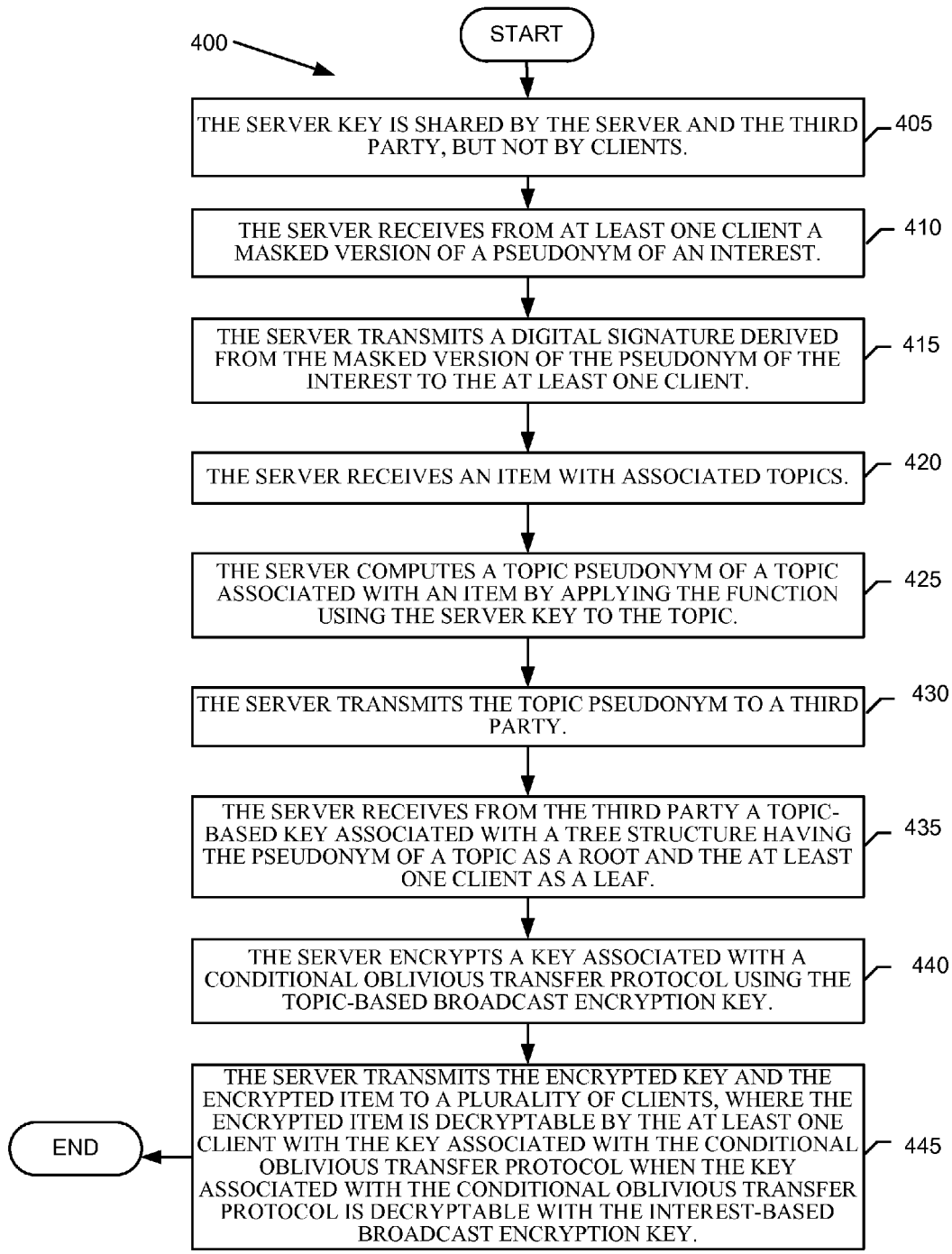
FIG. 4 is a process flow diagram illustrating of one embodiment of a method for providing privacy in a publish-subscribe protocol from the point of view of the server.

FIG. 4 is a process flow diagram illustrating of one embodiment of a method 400 for providing privacy in a publish-subscribe protocol from the point of view of the server 102. Method 400 may be performed by the processing logic 202 of the server 102 (e.g., in computer system 600 of FIG. 6) that may comprise hardware (e.g., circuitry, dedicated logic, programmable logic, microcode, etc.), software (such as instructions run on a processing device), firmware, or a combination thereof. In one embodiment, method 400 is performed by the function logic 206 and the encryption logic 210 of the processing logic 202 of the server 102 of FIG. 2.

In one embodiment, method 400 begins when, during a setup phase 302, at block 405, the server key is shared by the server 102 and the third party 106, but not by a plurality of clients 104a-104n. The server key and a third party key may be symmetric keys and may differ from each other.

During the subscribe phase 304, at block 410, the server 102 receives from at least one client (e.g., 104a) a masked version of a pseudonym of an interest. The masked version of the pseudonym of the interest is produced by the application of a function using the server key to an interest of the at least one client 104a to produce an interest pseudonym and the application of the function using a third party key to the interest pseudonym. The function may be a pseudo-random function. The pseudo-random function may be implemented using a block cipher or a keyed cryptographic hash function. At block 415, the server transmits a digital signature derived from the masked version of the pseudonym of the interest to the at least one client (e.g., 104a-104n). In response, the at least one client (e.g., 104a) is configured to forward an "add" or "delete" indication of the interest and to forward the digital signature of the masked interest pseudonym to the third party 106. The at least one client (e.g., 104a) is further configured to calculate and forward the interest pseudonym based on the digital signature of the masked interest to the third party 106. The at least one client (e.g., 104a) is further configured to receive from the third party 106 an interest-based key associated with a tree structure having the pseudonym of the interest as a root and the at least one client (e.g., 104a) as a leaf. This occurs when the third party 106 verifies the signature using the public verification key and inserts the interest pseudonym into the tree structure. The tree structure may be a broadcast encryption tree structure.

During the publish phase 306, at block 420, the server 102 receives an item (e.g., a data item) with associated topics. At block 425, the server computes a topic pseudonym of a topic associated with an item by applying the function using the server key to the topic. At block 425, the server 102 transmits the topic pseudonym to the third party 106. At block 430, the server 102 receives from the third party 106 a topic-based key associated with a tree structure having the pseudonym of a topic as a root and the at least one client (e.g., 104a) as a leaf. This occurs after the third party 106 inserts the interest pseudonym into the tree structure. The tree structure may be a broadcast encryption tree structure. At block 435, the server 102 encrypts a key associated with a conditional oblivious transfer protocol using the topic-based broadcast encryption key. At block 440, the server 102 encrypts an item with the key associated with the conditional oblivious transfer protocol. At block 445, the server 102 transmits the encrypted key and the encrypted item to a plurality of clients (e.g., 104a-104n). More particularly, to prevent traffic analysis, the server 102 may broadcast these keys to all clients (104a-104n) even though only clients in the same tree will be able to meaningfully use this message (i.e., be able to decrypt a data item). The encrypted item is decryptable by the at least one client (e.g., 104a) with the key associated with the conditional oblivious transfer protocol when the key associated with the conditional oblivious transfer protocol is decryptable with the interest-based broadcast encryption key.

Figure 5:
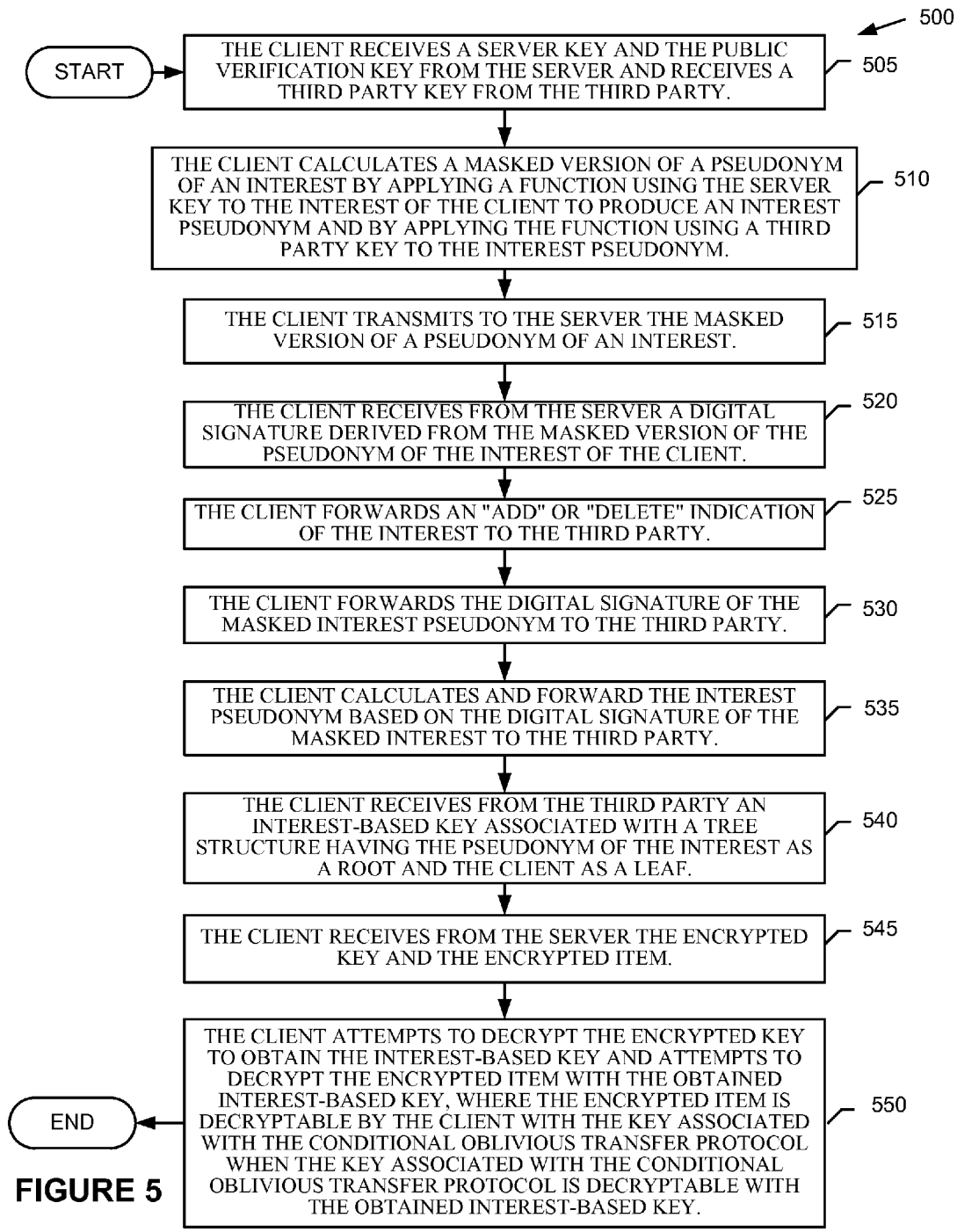
FIG. 5 is a process flow diagram illustrating of one embodiment of a method for providing privacy in a publish-subscribe protocol from the point of view of a client.

FIG. 5 is a process flow diagram illustrating of one embodiment of a method 500 for providing privacy in a publish-subscribe protocol from the point of view of a client (e.g. 104a). Method 500 may be performed by the processing logic 204 of the client 104a (e.g., in computer system 600 of FIG. 6) that may comprise hardware (e.g., circuitry, dedicated logic, programmable logic, microcode, etc.), software (such as instructions run on a processing device), firmware, or a combination thereof. In one embodiment, method 500 is performed by the function logic 218 and the encryption logic 212 of the processing logic 204 of the client 104a of FIG. 2.

In one embodiment, method 500 begins when, during a setup phase 302, at block 505, the client 104a receives a server key and the public verification key from the server 102 and receives a third party key from the third party 106. The server key and the third party key may be symmetric keys and may differ from each other.

During the subscribe phase 304, at block 510, the client 104a calculates a masked version of a pseudonym of an interest by applying a function using the server key to the interest of the client 104a to produce an interest pseudonym and by applying the function using a third party key to the interest pseudonym. The function may be a pseudo-random function. The pseudo-random function may be implemented using a block cipher or a keyed cryptographic hash function.

At block 515, the client 104a transmits to the server 102 the masked version of a pseudonym of an interest. At block 520, the client 104a receives from the server 102 a digital signature derived from the masked version of the pseudonym of the interest of the client 104a. At block 525, the client 104a forwards an "add" or "delete" indication of the interest to the third party 106. At block 530, the client 104a forwards the digital signature of the masked interest pseudonym to the third party 106. At block 535, the client 104a calculates and forward the interest pseudonym based on the digital signature of the masked interest to the third party 106. At block 540, the client 104a receives from the third party 106 an interest-based key associated with a tree structure having the pseudonym of the interest as a root and the client (104a) as a leaf. This occurs when the third party 106 verifies the signature using the public verification key and inserts the interest pseudonym into the tree structure. The tree structure may be a broadcast encryption tree structure.

During the publish phase 306, the server 102 is configured to receive an item (e.g., a data item) with associated topics. The server 102 is further configured to computes a topic pseudonym of a topic associated with an item by applying the function using the server key to the topic. The server 102 is further configured to transmit the topic pseudonym to the third party 106. The server 102 is configured to receive from the third party 106 a topic-based key associated with a tree structure having the pseudonym of a topic as a root and the client (e.g., 104a) as a leaf. This occurs after the third party 106 inserts the interest pseudonym into the tree structure. The tree structure may be a broadcast encryption tree structure. The server 102 is further configured to encrypt a key associated with a conditional oblivious transfer protocol using the topic-based broadcast encryption key. The server 102 is further configured to encrypt an item with the key associated with the conditional oblivious transfer protocol. At block 545, the client 104a receives from the server 102 the encrypted key and the encrypted item. At block 550, the client 104a attempts to decrypt the encrypted key to obtain the interest-based key and attempts to decrypt the encrypted item with the obtained interest-based key. The encrypted item is decryptable by the client 104a with the key associated with the conditional oblivious transfer protocol when the key associated with the conditional oblivious transfer protocol is decryptable with the obtained interest-based key.

Embodiments of the present disclosure have many advantages over prior art publish-subscribe privacy protection methods. The server 102 can store interests of many clients, add and delete subscriptions dynamically with no need to reprocess all items (only a small number of keys need to be broadcast to clients upon interest addition or deletion), and can periodically delete items to reclaim space without any participants learning the identity or the content of deleted items after they have been deleted. When the server 102 and the third party 106 process an item with a topic that the subscriber had previously subscribed to, the client (e.g., 104a) and the server 102 obtain two equal root keys ip-bkey and tp-bkey, respectively, from the third party 106 and employ these as inputs to a conditional oblivious transfer protocol (COT) with equality between these two strings as a predicate. As a consequence of COT, when the predicate is true, the client (104a) recovers the key k to decrypt the encrypted item.

The sever 102 learns no information about interests of any client as the server 102 only sees the outputs ip' of function F. The interest pseudonyms ip and the key tpkey that is unknown to the server 102, and thus are indistinguishable from random strings, due to properties of F. Malicious and colluding clients do not learn any information about other clients' subscriptions since communication with the clients 104a-104n by either the server 102 or the third party 106 during the publication protocol is the same for all clients. In particular, traffic analysis reveals no information.

As a consequence of properties of the COT (specifically, the property that when the predicate is false, the message transferred through the COT will not be successfully decrypted by the receiver), no information about the key k encrypting an unpublished item is revealed to any participants with no interest in this item during the publication protocol. As a further consequence of properties of COT (specifically, the property that the server 102 does not realize whether the message transferred through the COT is successfully decrypted by the receiver), the server 102 does not learn whether any individual item was published or not.

Publishing each item in the pull mode requires 4 block cipher applications per topic (and 2 per interest), 1 item symmetric encryption, and 1 item decryption per interested client. In the push mode, the 2 block cipher applications per interest (i.e., item encryption/decryptions) are performed by all clients (resp., all interested clients).

Figure 6:
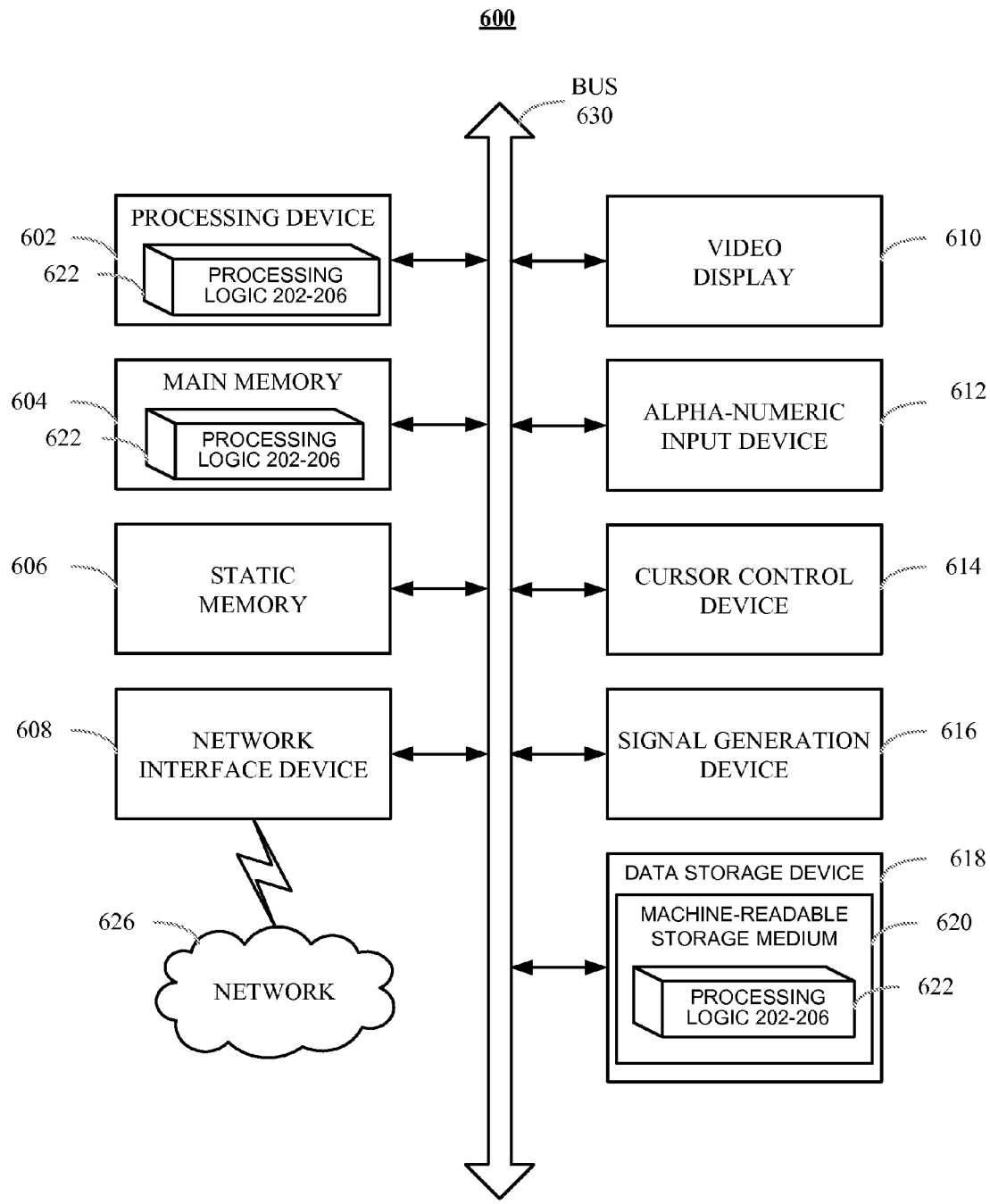
FIG. 6 illustrates a diagrammatic representation of a machine in the example form of a computer system within which a set of instructions, for causing the machine to perform any one or more of the methodologies discussed herein, may be executed.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute processing logic 202, 204, 206 for performing the operations and steps discussed herein.

Computer system 600 may further include a network interface device 608. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Data storage device 618 may include a machine-readable storage medium (or more specifically a computer-readable storage medium) 620 having one or more sets of instructions (i.e., the processing logic 202, 204, 206) embodying any one or more of the methodologies of functions described herein. The processing logic 202, 204, 206 may also reside, completely or at least partially, within main memory 604 and/or within processing device 602 during execution thereof by computer system 600; main memory 604 and processing device 602 also constituting machine-readable storage media. The processing logic 202, 204, 206 may further be transmitted or received over a network 626 via network interface device 608.

Machine-readable storage medium 620 may also be used to store processing logic 202, 204 persistently. While machine-readable storage medium 620 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method for providing privacy in a publish-subscribe protocol, comprising:
   receiving, by a server, an item with an associated topic;
   computing, by the server, a topic pseudonym for the associated topic by applying a function using a server key to the associated topic, wherein the server key is accessible to the server and a third party;
   transmitting, by the server, the topic pseudonym to the third party;
   responsive to the transmitting, receiving, by the server, from the third party, a topic-based key associated with a tree structure having the topic pseudonym as a root and at least one client as a leaf;
   encrypting, by the server, a conditional oblivious transfer protocol key using the topic-based key, creating an encrypted key;
   encrypting, by the server, the item with the conditional oblivious transfer protocol key, creating an encrypted item; and
   transmitting, by the server, the encrypted key and the encrypted item to a plurality of clients including the at least one client, wherein the at least one client can decrypt the encrypted key with an interest-based key, if an interest associated with the at least one client is equivalent to the associated topic.

2. The method of claim 1, wherein when the interest associated with the at least one client is equivalent to the associated topic the encrypted item is decryptable by the at least one client with the conditional oblivious transfer protocol key when the conditional oblivious transfer protocol key is decryptable with an interest-based key associated with a tree structure having a pseudonym of an interest as a root and the at least one client as a leaf.

3. The method of claim 1, further comprising, before receiving the key associated with a tree structure: receiving, by a server from the at least one client, a masked version of the pseudonym of the interest;

transmitting, by the server to the at least one client, a digital signature derived from the masked version of a pseudonym of the interest; and transmitting, by the server to the at least one client, a public verification key associated with the digital signature.

4. The method of claim 3, wherein the at least one client is configured to receive the interest-based key from the third party when the third party is configured to verify the digital signature using the public verification key.

5. The method of claim 1, wherein the masked version of the pseudonym of the interest of the at least one client is produced by an application of a function using a server key to the interest of the at least one client to produce an interest pseudonym and an application the function using a third party key to the interest pseudonym.

6. The method of claim 1, wherein the server key, the third party key, and the public verification key differ from each other.

7. The method of claim 1, wherein the server key and the third party key are symmetric keys.

8. The method of claim 1, wherein the function is a pseudo-random function.

9. The method of claim 8, wherein the pseudo-random function is implemented using a block cipher or a keyed cryptographic hash function.

10. The method of claim 1, wherein the conditional oblivious transfer protocol is an equality-based conditional oblivious transfer protocol.

11. The method of claim 1, wherein the tree structure having the topic pseudonym as a root or the tree structure having the pseudonym of the interest as a root is a broadcast encryption tree structure.

12. The method of claim 1, wherein the server employs a point-to-point secure communication protocol with the at least one client and the third party.

13. The method of claim 1, wherein the receiving of the topic-based key, the encrypting of the conditional oblivious transfer protocol key, the encrypting the item, and the transmitting of the encrypted key or the encrypted item, are performed for each of a plurality of clients requesting a pull when the server is in a pull mode.

14. The method of claim 1, wherein the receiving of the topic-based key, the encrypting of the conditional oblivious transfer protocol key, the encrypting the item, and the transmitting of the encrypted key or the encrypted item, are performed for each of a plurality of clients when the server is in a push mode.

15. A non-transitory computer readable storage medium storing executable instructions for execution by a client for performing a method, the method comprising:

receiving, by the client from a third party, an interest-based key associated with a tree structure having a pseudonym of an interest as a root and the client as a leaf;

receiving, by the client from a server, an encrypted item encrypted with a key associated with a conditional oblivious transfer protocol;

receiving, by the client from the server, an encrypted key for decrypting the encrypted item, wherein the encrypted key is an encrypted key associated with a conditional oblivious transfer protocol encrypted using a topic-based key associated with a tree structure having a pseudonym of a topic as a root and the client as a leaf; and if an interest used to compute the pseudonym of the interest is equivalent to a topic used to compute the pseudonym of the topic, decrypting, by the client, the encrypted key with the interest-based key and decrypting the encrypted item with the obtained interest-based key.

16. The non-transitory computer readable storage medium of claim 15, the method further comprising:

transmitting, from the client to the server, a masked version of the pseudonym of the interest; receiving, by the client from the server, a digital signature derived from the masked version of the pseudonym of the interest and a public verification key; and transmitting, from the client to the third party, the public verification key and the digital signature.

17. The non-transitory computer readable storage medium of claim 16, the receiving the interest-based key comprising receiving the interest-based key from the third party when the third party is configured to verify the digital signature using the public verification key.

18. The non-transitory computer readable storage medium of claim 15, the method further comprising: calculating, by the client, the masked version of the pseudonym of the interest by applying a function using a server key to the interest of the client to produce an interest pseudonym and applying the function using the third party key to the interest pseudonym.

19. The non-transitory computer readable storage medium of claim 15, the method further comprising: providing, by the client, an indication to the third party to add the interest pseudonym to the tree structure having the pseudonym of the topic as a root or the tree structure having the pseudonym of the interest as a root.

20. The non-transitory computer readable storage medium of claim 15, the method further comprising: providing, by the client, an indication to the third party to delete the interest pseudonym from the tree structure having the pseudonym of the topic as a root or the tree structure having the pseudonym of the interest as a root.

21. A computer system for providing privacy in a publish-subscribe protocol, comprising:

a memory; and a processing device in communication with the memory, wherein the computer system is configure to perform a method, the method comprising:

receiving an item with an associated topic;

computing a topic pseudonym for the associated topic by applying a function using a server key to the associated topic, wherein the server key is accessible to the server and a third party;

responsive to the transmitting, receiving from the third party, a topic-based key associated with a tree structure having the topic pseudonym as a root and at least one client as a leaf;

encrypting a conditional oblivious transfer protocol key using the topic-based key, creating an encrypted key;

encrypting the item with the conditional oblivious transfer protocol key, creating an encrypted item; and transmitting the encrypted key and the encrypted item to a plurality of clients including the at least one client, wherein the at least one client can decrypt the encrypted key with an interest-based key, if an interest associated with the at least one client is equivalent to the associated topic.

22. The system of claim 21, wherein when the interest associated with the at least one client is equivalent to the associated topic, the encrypted item is decryptable by the at least one client with the key associated with the conditional oblivious transfer protocol when the key associated with the conditional oblivious transfer protocol is decryptable with an interest-based key associated with a tree structure having a pseudonym of an interest as a root and the at least one client as a leaf.

* * * * *